United States Patent [19]

Milligan

[11] 4,398,852
[45] Aug. 16, 1983

[54] PROCESS AND APPARATUS FOR ADDING AND REMOVING PARTICLES FROM PRESSURIZED REACTORS

[75] Inventor: John D. Milligan, Little Silver, N.J.

[73] Assignee: HRI, Inc., Lawrenceville, N.J.

[21] Appl. No.: 235,195

[22] Filed: Feb. 17, 1981

Related U.S. Application Data

[63] Continuation-in-part of Ser. No. 142,523, Apr. 21, 1980, abandoned, which is a continuation of Ser. No. 920,824, Jun. 30, 1978, abandoned.

[51] Int. Cl.³ .............................................. B65G 53/30
[52] U.S. Cl. .................................... 406/47; 406/124; 422/219; 208/152
[58] Field of Search ................ 406/47, 197, 124, 125, 406/126, 175, 109; 208/152, 157, 176; 422/140, 211, 213, 219; 414/217, 220, 221

[56] References Cited

U.S. PATENT DOCUMENTS

| | | | |
|---|---|---|---|
| 2,338,606 | 1/1944 | Voorhees | 422/219 X |
| 2,705,080 | 3/1955 | Hicks | 414/220 |
| 2,867,478 | 1/1959 | Shale | 406/124 X |
| 2,904,506 | 9/1959 | Penick | 422/219 X |
| 3,235,313 | 2/1966 | Waldhofer | 406/124 |
| 3,410,791 | 11/1968 | Perry et al. | 406/124 X |
| 3,523,888 | 8/1970 | Stewart et al. | 422/219 X |
| 3,547,809 | 12/1970 | Ehrlich et al. | 208/157 X |
| 4,059,502 | 11/1977 | James | 208/152 |

Primary Examiner—Andres Kashnikow
Assistant Examiner—L. E. Williams
Attorney, Agent, or Firm—V. A. Mallare; F. A. Wilson

[57] ABSTRACT

A method for adding and removing fine particles from a pressurized reactor is provided, which comprises connecting the reactor to a container, sealing the container from the reactor, filling the container with particles and a liquid material compatible with the reactants, pressurizing the container to substantially the reactor pressure, removing the seal between the reactor and the container, permitting particles to fall into or out of the reactor, and resealing the container from the reactor. An apparatus for adding and removing particles is also disclosed.

7 Claims, 3 Drawing Figures

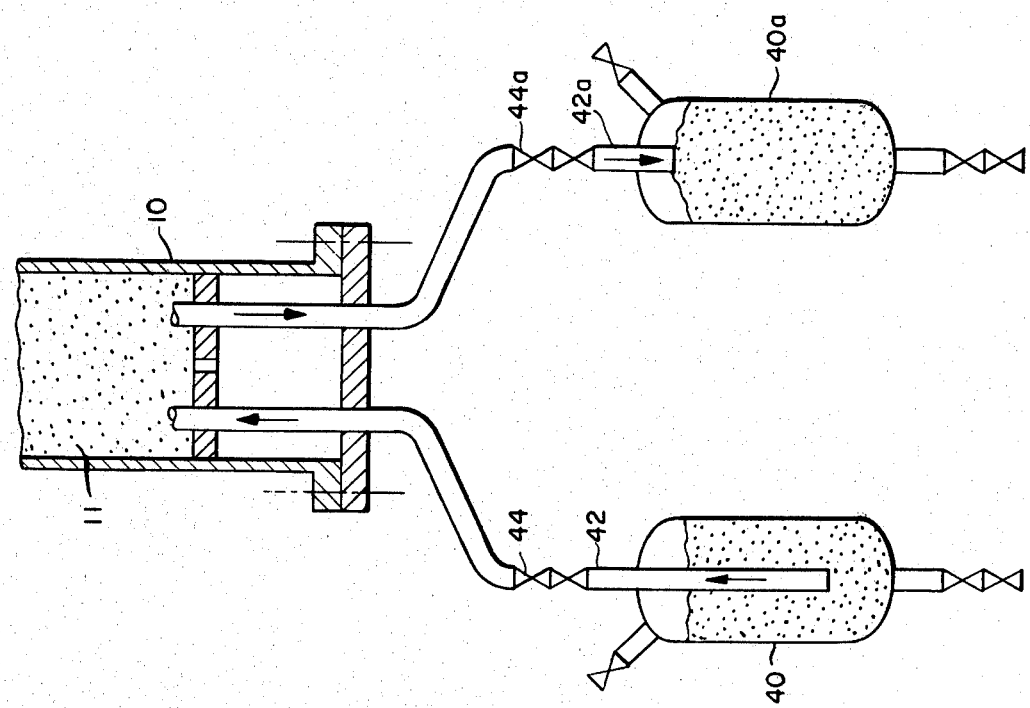
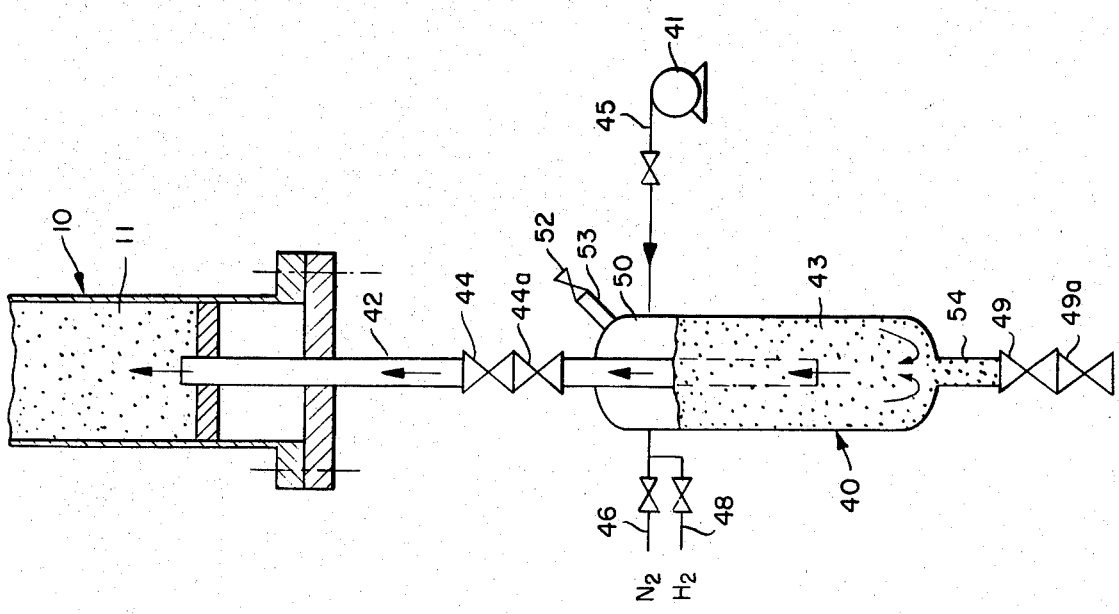

PROCESS AND APPARATUS FOR ADDING AND REMOVING PARTICLES FROM PRESSURIZED REACTORS

BACKGROUND OF THE INVENTION

This application is a continuation-in-part of Ser. No. 142,523 filed Apr. 21, 1980, which was a continuation of original application Ser. No. 920,824, filed June 30, 1978, both now abandoned.

FIELD OF THE INVENTION

This invention relates to a method of adding and removing solid particles from high pressure reactors and the apparatus therefor. More specifically, this invention pertains to a process and apparatus for adding and removing catalyst particles from a highly pressurized reactor wherein gaseous and liquid reactants are contacted.

DESCRIPTION OF THE PRIOR ART

In various catalytic reactors and similar reaction systems, it is usually necessary to periodically replace a particulate solid material, such as a catalyst, in the reactor. For fixed-bed contacting systems, such as a packed bed, it is not feasible to add or withdraw particulates while the reactor is in operation. However, with the advent of the upflow ebullated bed reactor, such as that disclosed in U.S. Pat. No. Re. 25,770 and other types of fluidized bed reactors, the addition and removal of catalyst solids from the pressurized reactor without interrupting or disturbing the ongoing reaction has become an important factor with respect to the advantages of such reactors. Generally, it is normal procedure to commence operations with a bed of fresh catalyst solids in the reactor. Alternatively, a catalyst particles inventory in the reactor is obtained by introducing the solids at a high addition rate. After the desired particles level has been obtained, the addition rate is decreased while the withdrawal rate of particles from the reactor is adjusted so that it is equal to the addition rate, thus producing a constant inventory of solids in the reactor.

A major requirement for solids addition and removal systems for pressurized reactors is that, since the reactors operate at relatively high pressures and temperatures, usually in excess of 1000 psig and between 500°–1000° F., respectively, the addition or removal system must be pressurized so that the material within the reactor will not be blown out through the addition or removal system.

Two basic mechanisms have been developed for such on-line solids addition and removal systems. The first comprises the use of gas transfer systems, which may be either of the plug-flow or the dilute-phase transfer type. In plug flow, the solid particles are essentially tightly packed within the transfer conduit leading into or from the reactor. A compatible, pressurized gas is then used to force the mass of solids along the transfer conduit. The usual problem encountered in such gas-driven, plug-flow systems is that the gas flows through the interstitial spacing between the solid particles, which results in serious plugging of the conduits with little or no movement of the particles through the system. As to the dilute-phase transport method, a high volume of gas with a relatively small amount of particles is used. The gases, which are at relatively high velocities, carry the solids along the transfer conduit into or away from the reactor. The major problem associated with this type of transport method is the high solid attrition rate which results from the extremely rough treatment the particles receive as they come in contact with the conduit walls and other particles. Additional problems include the high gas volume required for transporting a given amount of solids and the possible incompatibility of the gaseous transfer agent with the reactants within the reactor.

The second solids addition and removal system comprises the use of a liquid transfer agent. According to this type of transport system, the particles to be added are mixed with the liquid transfer agent to form a slurry which is then pumped into the reactor. The basic disadvantage of such liquid transfer systems is that they are complex and expensive. In addition, the tortuous path which the particles go through as they travel through the pump results in severe attrition of the particles. This attrition problem must be avoided in an ebullated bed contacting system, since it is critical in such contacting systems to use particles within a relatively narrow diameter range. Thus, it is apparent that the attrition of the particles due to the method of introduction and removal to the reactor could result in severe operating difficulties in ebullated bed contacting systems.

Such liquid-type solids transfer systems have been disclosed in U.S. Pat. Nos. 3,398,085 and 3,547,809. These patents teach that the catalyst attrition problems can be avoided by passing only solids-free liquid through the pressurizing pumps. The pressurized liquid carries the particles into the reactor. However, it must be noted that such catalyst particles handling systems are complex and often cause substantial disturbance in the operation of the reactor, so that a simpler and steadier method of withdrawing and replacing catalysts in pressurized reactors is needed.

SUMMARY OF INVENTION

According to the present invention, a process whereby fine particles, more specifically catalyst particles, may be added to or withdrawn from a highly pressurized reactor using relatively low transfer medium volumes and without suffering from the above-mentioned disadvantages, is disclosed.

More specifically, it has been found that the above-mentioned disadvantages may be reduced substantially by using a process comprising connecting a container to the reactor, sealing the container from the reactor, filling the container with the particles and a material which is compatible with the reactants in the reactor, sealing the container from the atmosphere, pressurizing the container to substantially the reactor pressure, removing the seal between the container and the reactor to permit either the removal of particles by allowing the particles to fall into the container, or adding particles to the reactor by forcing the particles out of the container into the reactor, flushing the transfer conduit with a pressurized liquid to remove particles therefrom, sealing the container from the reactor, and depressurizing the container and recovering the particles contained therein.

By using the particles addition and removal method and apparatus of the present invention, the ebullating flow conditions in the reactor are not substantially changed. Furthermore, the expanded catalyst bed volume in the reactor is not changed since the catalyst particles removed are automatically replaced with an equal volume of transfer medium; e.g., oil. In addition, all of the connecting conduits and valves are free of particles, which eliminates the problem of their plugging.

Furthermore, the present invention provides a method and apparatus for adding and removing particles from a pressurized reactor without subjecting the particles to harsh processing steps such as pumping. As a result, particle attrition is reduced and the narrow range of particle diameters used in an ebullated bed reactor is preserved, despite the addition or removal of such particles therefrom.

DESCRIPTION OF THE DRAWINGS

FIG. 2 shows a schematic diagram of another embodiment of the present invention for adding and removing catalyst particles to and from a pressurized reactor at its lower end.

FIG. 3 is a schematic diagram of another embodiment of the present invention for adding and removing catalyst particles to and from a pressurized zone using two pressurizable containers.

DESCRIPTION OF THE PREFERRED EMBODIMENTS

Figure 1:
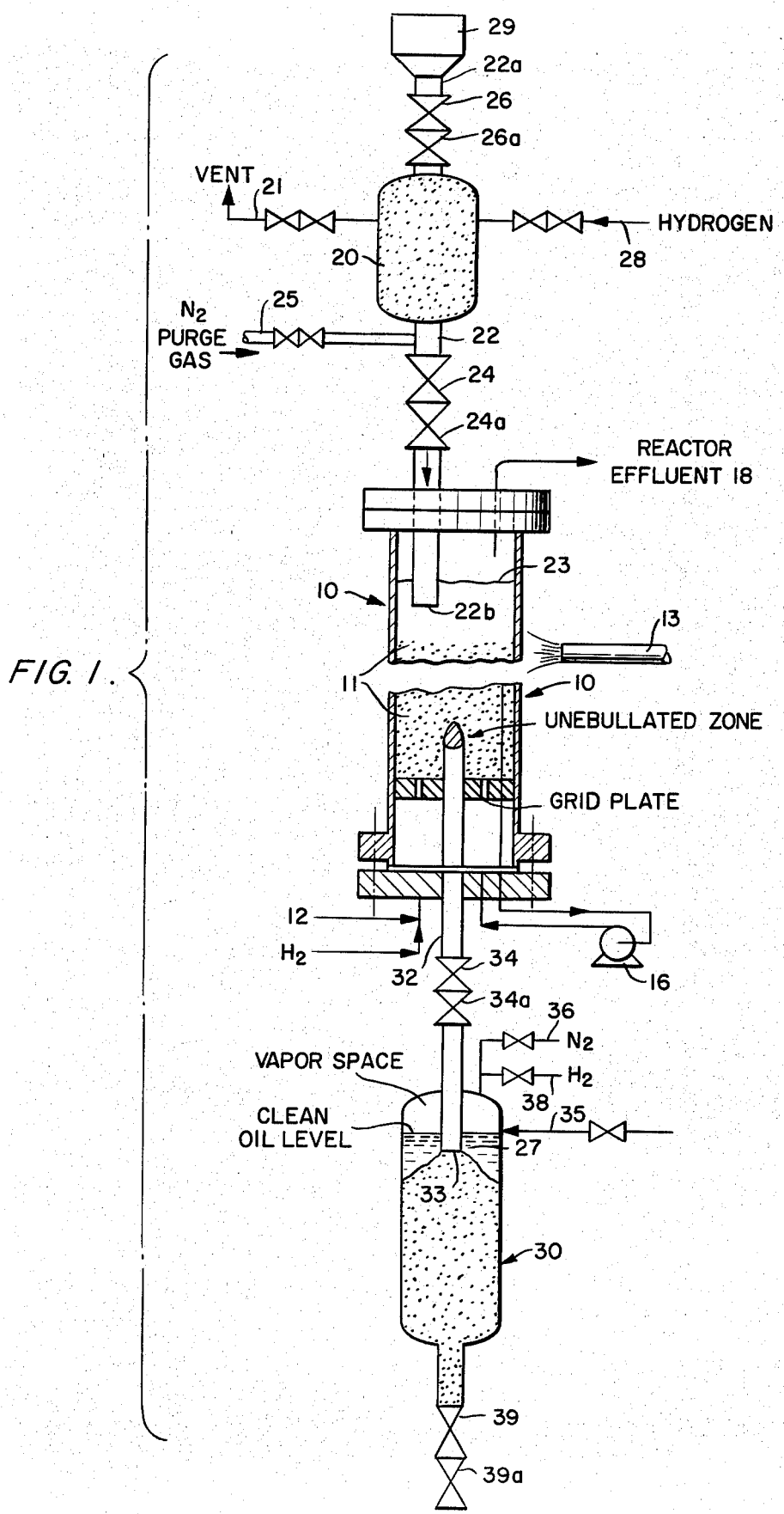
FIG. 1 is a schematic diagram of an apparatus for adding and removing particles to and from a pressurized reactor according to the present invention.

As shown in FIG. 1, pressurized reactor 10, containing an ebullated bed 11 of catalyst particles, is fed with a liquid or slurry reactant such as coal-oil at 12 and hydrogen gas at 14. The reactor liquid is recirculated by pump 16 to maintain the catalyst bed 11 in an expanded or ebullated condition. Reactor 10 is usually operated at a pressure of from about 1000 to 10,000 psig and at a temperature of from about 500° to about 1000° F. The catalyst bed is usually expanded from about 10% to about 100% of the settled bed level. The catalyst may be in the form of beads, pellets, lumps, chips, or extrudates and generally has an average dimension of at least 1/32 inch, more preferably within the range of between 1/16 to ¼ inch (0.8–6.3 mm). By way of example and without limitation, the invention has been demonstrated utilizing catalyst extrudates having an average diameter of 1.61 mm and having an average length of 4.96 mm. The height of the expanded or ebullated bed 11 of particles is monitored by means of nuclear level indicating device 13. Reactor effluent is removed through conduit 18.

A catalyst container 20 is connected to the top portion of pressurized reactor 10 by means of conduit 22, which is provided with shutoff valve 24. If desired, two shutoff valves, 24 and 24a, may be used in series so as to obtain a leak-proof closure. The lower end 22b of conduit 22 preferably terminates below liquid level 23 and above ebullated catalyst bed 11. The top portion of container 20 is connected to catalyst particle feed hopper 29 by means of conduit 22a, which is provided with valve 26 for shutting off flow. Two valves, 26 and 26a, may be used is series to provide a leak-proof closure, if desired. In addition to conduit 22a, the upper portion of container 20 is provided with two valved connections, 21 and 28. Valve 21 is for venting the container to atmospheric pressure, whereas valve 28 is for pressurizing container 20 with hydrogen. Valve 25 is connected to the portion of conduit 22 between container 20 and valve 24 for the purpose of introducing an inert gas such as nitrogen for purging the container.

When it is desired to add catalyst particles to pressurized reactor 10, valve 24 is closed, thus sealing container 20 from reactor 10. Container 20 is then vented to atmospheric pressure through valve 21. An inert gas such as nitrogen is introduced into container 20 through valve 25 to remove any traces of hydrogen. After this purging step, valves 21, 28 and 25 are all closed. Fresh catalyst particles are then charged into container 20 from hopper 29 through open valve 26. After a sufficient amount of catalyst particles has been charged to fill container 20, valve 26 is closed and container 20 is pressurized with hydrogen through valve 28 to substantially the reactor pressure. Outlet valve 24 is then opened and the particles are allowed to fall by gravity through conduit 22 into reactor 10 to a point below liquid level 23 but above ebullated bed 11. This conduit arrangement avoids any carryover of the added particles (catalyst) from reactor 10 with the continuously flowing reactor effluent stream 18. Furthermore, terminating conduit 22 at a point 22b above ebullated bed 11 prevents particles from the bed entering the conduit and possibly plugging it.

As further indicated in FIG. 1, the bottom portion of reactor 10 is connected to spent catalyst container 30 by means of conduit 32, which is provided with shutoff valve 34. If desired, two shutoff valves, 34 and 34a, may be used in series to obtain a leak-proof closure. The lower end 33 of conduit 32 extends into the upper portion of container 30 by at least about 10% of the container's vertical height, and preferably by 15 to 40% of its height. Valves 35, 36 and 38 are also connected to the upper part of container 30 for pressurizing and venting purposes. Valve 35 is for introducing pressurized, clean oil into container 30. Valve 36 is for the introduction of an inert gas into the container. Valve 38 is for introducing pressurized hydrogen into container 30. The lower portion of container 30 is provided with exit valve 39. To insure a leak-proof closure, two valves, 39 and 39a, connected in series may be used.

To remove spent catalyst particles from reactor 10, valve 34 is first closed, thus sealing container 30 from the reactor. Container 30 is then filled with a liquid material, which is compatible with the reactor liquid, through valve 35. As an example of a suitable liquid, hydrocarbon oil having a density of about 0.95–0.97 gm/cm$^3$ and a viscosity of about 2–8 cp may be named. The liquid is usually at ambient temperature but may have temperature up to about 200° F. Container 30 is then purged with an inert gas such as nitrogen through valve 36 to remove all traces of oxygen. Thereafter, container 30 is pressurized with hydrogen through valve 38 to substantially the reactor pressure, which is usually in the range of from about 1,000 to about 10,000 psig (70–700 atm). Valve 34 is then opened, allowing spent catalyst particles from the lower portion of ebullated bed 11 to fall by means of gravitational force into container 30. As the particles descend into container 30, and equal volume of liquid originally contained therein is moved upwardly into reactor 10. It is noted that during the particles withdrawal operation, the hot catalyst particles and cold liquid flow in a counter-current relationship, so that the upflowing liquid serves to quench and cool the catalyst particles appreciably.

The spent catalyst particles fill container 30 up to lower end 33 of conduit 32, as shown in FIG. 1, and thereafter continue to accumulate in conduit 32. When container 30 and conduit 32 are filled, pressurized oil may be introduced into container 30 through valve 35 to flush the catalyst particles remaining in conduit 32 and valve 34 upwardly into bed 11. After conduit 32 and valve 34 are cleared of particles, valve 34 is closed quickly. Container 30 is then depressurized to atmospheric pressure and any hydrocarbon gas which may have been drawn into container 30 is vented. An inert gas such as nitrogen is then introduced into container 30 through valve 36 to remove any remaining traces of hydrogen. Exit valve 39 (and 39a) for container 30 is then opened, thus removing the spent catalyst particles and the associated liquid from container 30 for disposal or regeneration, as desired.

It is noted that the density difference between the used catalyst particles and the reactor liquid should be at least about 10 lb/ft$^3$, and preferably from about 20 to 60 lb/ft$^3$ (320.4 to 961.1 kg/m$^3$) for effective removal of the catalyst.

As an alternative to the embodiment shown in FIG. 1, the catalyst particles withdrawal container may be modified, as shown in FIG. 2, and used for both particles addition and withdrawal steps for reactor 10, thus eliminating the need for overhead particles addition container 20 and conduit 22. According to the embodiment shown in FIG. 2, the construction of FIG. 1 has been modified by extending the lower end 43 of conduit 42 to about the mid-point of container 40. In the event that the cross-sectional area of container 40 is too large to permit sufficient entrainment velocity to be attained therein to carry particles from container 40 into conduit 42, the lower end of conduit 42 may be extended to the bottom portion of container 40 in order to provide for more effective fluid transport of particles upwardly through conduit 42 into reactor 10. It is also noted that fresh catalyst particles may be added to container 40 through valve 52 and conduit 50, which is connected to the top portion of the container.

When it is desired to add catalyst particles to reactor 10 by using the apparatus shown in FIG. 2, container 40 is sealed from reactor 10 by closing valve 44. After depressurizing container 40, valve 52 is opened to allow the introduction of a desired amount of fresh catalyst particles at atmospheric pressure with valve 49 (and 49a) being closed. Valve 52 is then closed and the container purged with an inert gas, such as nitrogen, through valve 46 and valve 52 to remove all traces of oxygen. A liquid, which is compatible with the reactor liquid, is fed into container 40 via valve 45 by means of circulating pump 41, so as to fill and pressurize container 40 to substantially the reactor pressure. Valve 44 in conduit 42 is then opened so as to permit the fluid transfer of the particles located above lower end 43 of conduit 42 upwardly into ebullated bed 11 in reactor 10. A pressurized liquid having a pressure slightly higher than that in the reactor introduced through valve 45 is used to force the particles upwardly through conduit 42 into the reactor.

On the other hand, when it is desired to remove or withdraw spent catalyst particles from ebullated bed 11 into container 40, the container is first sealed from the reactor by closing valve 44. In the event that container 40 is already filled with a mixture of catalyst particles and reactor liquid, such are removed therefrom through conduit 54 and exit valve 49. Valve 49 is then closed and the container 40 filled through valve 45 with a liquid material compatible with the reactor liquid. Container 40 is then purged with an inert gas such as nitrogen through valve 46 and valve 52, or preferably through smaller vent valve 53, to remove all traces of oxygen. Hydrogen is then introduced through valve 48 to pressurize the container to substantially the reactor pressure. Valve 44 is then opened to allow spent catalyst particles from ebullated bed 11 to fall by gravitational force into container 40, thereby displacing an equal volume of the liquid upward into reactor 10. After a sufficient amount of catalyst particles has been removed and conduit 42 and valve 44 flushed free of particles using liquid introduced through valve 45, valve 44 is closed. Container 40 is then depressurized to permit recovery of the spent catalyst particles through valve 49.

Although one container 40, as per the FIG. 2 embodiment, may be used alternately for adding and removing catalyst particles to the reactor, it is usually more convenient and preferable to connect two containers to the reactor lower end, one container for particulate solids addition and the other for solids removal. Alternatively, one container may be used as in FIG. 2 while the other serves as a spare. Accordingly, as a further embodiment of the present invention, two catalyst containers, as shown in FIG. 3, are connected to the bottom portion of reactor 10. In one container 40, conduit 42 extends to near the bottom of the container to facilitate particles addition to the reactor 10, as described above for FIG. 2. For the other container 40a, conduit 42a terminates in the upper portion thereof, the container being used for particles removal from reactor 10, also as described for FIG. 2.

The present invention is further illustrated by the following example. However, it is noted that the example is for illustrative purposes and should not be considered to be limiting the scope of the invention.

EXAMPLE

Catalyst particles comprising 1/16-inch diameter cobalt-molybdate on alumina extrudates were periodically added to an ebullated bed reactor, having an inner diameter of 8.5 inches (21.6 cm) and a length of 30 feet (9.1 meter). A coal-oil slurry feed was introduced into the reactor, which was operating at about 850° F. temperature and 2800 psig pressure. A sufficient amount of catalyst particles was first placed in a pressurizable addition container located above the reactor to substantially fill the container (about 200 cu in). The upper shutoff valve above the container was then closed, after which the lower valve was opened, thereby allowing the catalyst particles in the addition container to fall by gravity through the interconnecting fill conduit into the reactor catalyst bed. The catalyst added was about 3-10% of that normally contained in the reactor, so as to produce only a minor change in reactor catalyst bed level or operations.

When the activity of the catalyst bed in the reactor declined noticeably so that it was desired to remove and replace some of the spent (or used) catalyst, the withdrawal container located below the reactor was first purged with an inert gas, in this case nitrogen. Next, the withdrawal container was filled with oil from an external source and then pressurized with hydrogen to substantially reactor pressure. The withdrawal valve was opened, thus allowing the hot, spent catalyst to descend from the reactor through the connecting conduit and valve into the withdrawal container, thereby displacing an equal volume of oil from the container upwardly into the reactor. This withdrawal procedure required about 10 minutes.

When the catalyst withdrawal container and its connecting conduit became filled with spent catalyst (about 200 cu in) and the withdrawal stopped, the catalyst contained within the withdrawal conduit was first purged back into the reactor using pressurized oil, and then the withdrawal valve was closed. The spent catalyst and associated oil were then removed from the withdrawal container. This fresh catalyst addition and used catalyst withdrawal process was repeated alternately as needed in order to maintain the catalyst activity in the reactor at a desired level.

From the above description, it is apparent that the present invention provides a process and apparatus for withdrawing spent catalyst particles from a pressurized, ebullated-bed reactor wherein the disturbance in operations resulting from the particles removal is substantially reduced. Furthermore, the present invention provides a process and apparatus for adding, as well as withdrawing, catalyst particles from a pressurized reactor without disturbing the continuous operation of the reactor. Since the catalyst particles are not subjected to any pumping operation, the attrition of the particles is significantly reduced.

Although the above description discloses a preferred embodiment of the present invention which is particularly applicable to the hydrogenation of liquid hydrocarbons and wherein each of the liquids is a hydrocarbon, it is recognized that many modifications will be obvious to those skilled in the art. It is understood, therefore, that this invention is not limited to only those specific methods, steps, or combination or sequence of method steps described, but covers all equivalent steps or methods that may fall within the scope of the appended claims.

What I claim is:

1. A method for withdrawing particles from a pressurized reactor, comprising:
   (a) connecting a container to the bottom portion of the reactor by means of a conduit which extends to the top portion of the container by at least about 10 percent of container height;
   (b) sealing the container from the reactor;
   (c) filling the container with a liquid material compatible with the reactants in the reactor;
   (d) pressurizing the container to substantially the reactor pressure;
   (e) removing the seal between the reactor and the container to allow the particles to descend into the container, while said liquid material flows upwardly into the reactor countercurrent to the flow of particles;
   (f) sealing the container from the reactor; and
   (g) depressurizing the container and recovering the particles contained therein.

2. The method of claim 1, wherein the container is purged with an inert gas between steps (b) and (d), and then pressurized with hydrogen.

3. The method of claim 2, wherein an additional step between steps (e) and (f) comprises flushing the conduit and sealing valve means upwardly with a pressurized fluid to remove particles collected therein and force them into the reactor.

4. The method of claim 3, wherein the density difference between the particles and the liquid is from about 10 lb/ft$^3$ to about 60 lb/ft$^3$.

5. A method of removing catalyst particles from a pressurized reactor, comprising:
   (a) connecting a container to the bottom end of the reactor by means of a conduit which extends into the top portion of the container;
   (b) sealing the container from the reactor by valve means;
   (c) filling the container with a hydrocarbon liquid material which is compatible with the reactants in the reactor;
   (d) pressurizing the container with gas to substantially the reactor pressure;
   (e) opening the valve seal means and permitting the particles to descend into the container while an equal volume of said liquid in the container flows countercurrently upward into the reactor;
   (f) sealing the container from the reactor by valve means; and
   (g) depressurizing the container and recovering the catalyst particles contained therein.

6. The method of claim 5, wherein the container is purged with an inert gas between steps (b) and (c).

7. The method of claim 6, wherein between steps (e) and (f) the conduit and sealing means are flushed free of particles by means of a pressurized liquid.

* * * * *